United States Patent

Rajic et al.

[11] Patent Number: 5,754,290
[45] Date of Patent: May 19, 1998

[54] MONOLITHIC SPECTROMETER

[75] Inventors: Slobodan Rajic, Knoxville; Charles M. Egert, Oak Ridge; William K. Kahl; William B. Snyder, Jr., both of Knoxville; Boyd M. Evans, III, Oak Ridge; Troy A. Marlar, Knoxville; Joseph P. Cunningham, Oak Ridge, all of Tenn.

[73] Assignee: Lockheed Martin Energy Systems, Inc., Oak Ridge, Tenn.

[21] Appl. No.: 749,878

[22] Filed: Nov. 15, 1996

Related U.S. Application Data

[63] Continuation of Ser. No. 498,416, Jul. 5, 1995, abandoned.
[51] Int. Cl.[6] .................................................. G01J 3/28
[52] U.S. Cl. .................................................. 356/328
[58] Field of Search .................................. 356/328, 300, 356/326, 330-334; 385/37; 359/900

[56] References Cited

U.S. PATENT DOCUMENTS

| | | | |
|---|---|---|---|
| 4,744,618 | 5/1988 | Mahlein | 385/37 |
| 4,836,634 | 6/1989 | Laude | 385/37 |
| 5,026,150 | 6/1991 | Dorain et al. | 356/328 |

FOREIGN PATENT DOCUMENTS

| | | | |
|---|---|---|---|
| 556320 | 1/1980 | Japan | 356/328 |
| WO92/11517 | 7/1992 | WIPO | 356/328 |

OTHER PUBLICATIONS

Carl Zeiss, "Monolithic Miniature Specrometer—MMS 1," *Photonics Spectra*, May, 1994, p. 91.

*Primary Examiner*—K. Hantis
*Attorney, Agent, or Firm*—Patrick D. Guettner; Joseph A. Marasco

[57] ABSTRACT

A monolithic spectrometer is disclosed for use in spectroscopy. The spectrometer is a single body of translucent material with positioned surfaces for the transmission, reflection and spectral analysis of light rays.

2 Claims, 6 Drawing Sheets

MONOLITHIC SPECTROMETER

This application is a continuation of Ser. No. 08/498,416 filed Jul. 5, 1995 now abandoned.

The United States Government has rights in this invention pursuant to Contract No. DE-AC05-84OR21400 between the United States Department of Energy and Lockheed Martin Energy Systems, Inc. (formerly Martin Marietta Energy Systems, Inc.). The invention was funded by WFO Interagency Agreement 1855-1662-A1.

FIELD OF THE INVENTION

The present invention relates to spectroscopy, and more particularly to a new and improved spectrometer comprising a single, unitary body of material.

BACKGROUND OF THE INVENTION

The spectrometer, a device with which to analyze light, has been around for about one hundred years. Its usefulness has been extraordinary, and even today its potential uses are increasing. However, the science of spectroscopy to this day is practiced with the use of cumbersome equipment which is comprised of mirrors and lenses and positioning components that are very susceptible to misalignment, distortion, moisture, malfunction and other defects. Today's spectrometer has not been an object of miniaturization as has been other technological machines and equipment because of the lack of technology in making it so. Thus, wider application of the spectrometer has not been possible for areas where miniaturization has become increasingly necessary or preferable. These disadvantages of the modern spectrometer have been overcome with the present invention, both in the invention itself and the method with which it is made.

Regarding the method with which to make the present invention, previous methods utilized in making spectrometers involved optical grinding of lenses such as found in normal optics work. Some breakthrough in the methodology was necessary in order to fabricate the aspheric surfaces, having intersecting surfaces, on the same surface which heretofore represented a major obstacle.

The need to produce aspheric optics as with the monolithic spectrometer in a timely manner and the difficulty in testing these surfaces for accuracy of alignment prompted research in self-aligned and self-contained optical systems. Traditional self-aligned optics have consisted of two coaxial aspheric surfaces, produced in a single machining step with single-point diamond cutting. The present method, developed for the manufacture of the monolithic spectrometer but applicable for other aspheric surface manufacture, manufactures multiple optical surfaces with intersecting axes in a few machining steps while maintaining a high degree of accuracy heretofore unachieved.

OBJECTS OF THE INVENTION

Accordingly, it is an object of the present invention to provide a new and improved spectrometer. In view of the foregoing disadvantages inherent in known types of spectrometers now present in the prior art, the present invention provides a single, unitary spectrometer which can be used in wider and more novel applications. As such, the general purpose and therefore an object of the invention, which will be described subsequently in greater detail, is to provide a new and improved spectrometer which has many advantages over the prior art and none of the disadvantages.

It is another object of the invention to eliminate the many components of the modern spectrometer and the multiple defects associated with the manufacture, alignment and maintenance of these components.

A further object of the present invention is to miniaturize the spectrometer to sizes that are amenable to wider application.

An even further object of the invention is to provide a spectrometer which can be manufactured more easily and at lower cost.

Still yet another object of the invention is to provide a more accurate spectrometer through finer precision of manufacturing.

And yet another object of the invention is to apply a recently discovered method of machining aspheric surfaces on a single unitary, monolithic component of optically homogeneous material substrate to make the invention with extreme precision as well as to eliminate problems associated with alignment, adjustment and vibration.

Further and other objects of the present invention will become apparent from the description contained herein. These together with other objects of the invention, along with the various features of novelty which characterize the invention, are pointed out with particularity in the claims annexed to and forming a part of this application. For a better understanding of the invention, its advantages and the specific objects attained by its use, reference should be made to the accompanying drawings and descriptive matter in which there is illustrated preferred embodiments of the invention.

SUMMARY OF THE INVENTION

In accordance with one aspect of the present invention, the foregoing and other objects are achieved by the spectrometer having a single, unitary body with multiple surfaces and machined from a transparent and optically homogeneous material using a unique method. The surfaces on the spectrometer have a very precise finish and are positioned with respect to each other to permit entry of light rays into the spectrometer and reflection of the same light rays from surface to surface until spectral analysis is made by a detector material on the exiting surface. The spectrometer therefore comprises a single component and eliminates the disadvantages of misalignment and constant realignment, among others, found in the prior art. In addition the spectrometer can be made in miniature sizes to accommodate the needs and novel applications of modern-day spectroscopy.

The unique method utilized in making the present invention possible can be applied again and again to make various sizes and embodiments of monolithic spectrometers as well as be generically applied to produce other similar optical equipment.

Figure 1:
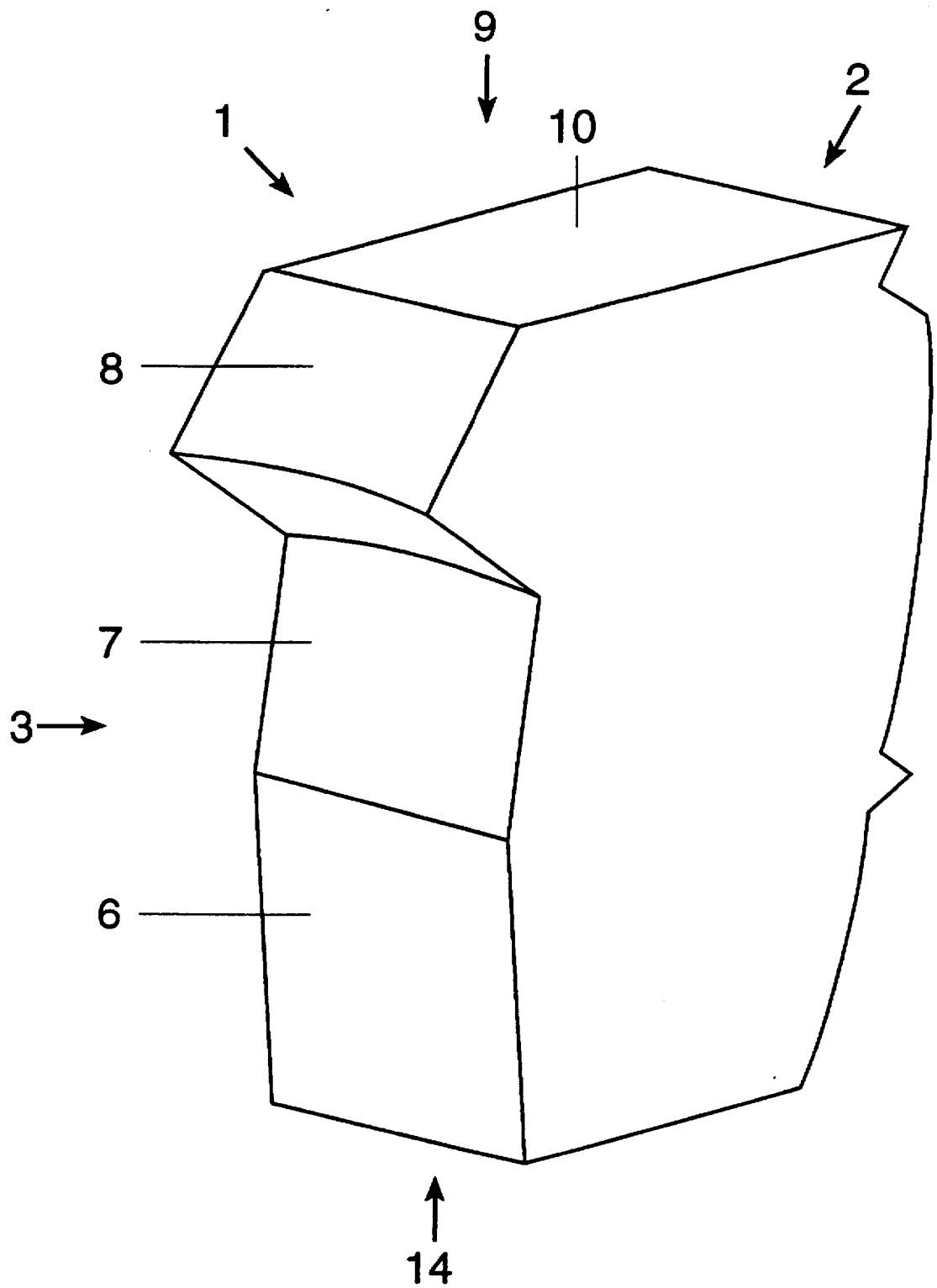
FIG. 1 is an isometric view of the spectrometer with the top and front sides facing the viewer.

For a better understanding of the present invention, together with other and further objects, advantages and capabilities thereof, reference is made to the following disclosure and appended claims in connection with the above-described drawings.

DETAILED DESCRIPTION OF THE INVENTION

With reference now to the drawings, and in particular to FIGS. 1 to 6 thereof, a new and improved spectrometer 1 embodying the principles and concepts of the present invention, and generally designated by the reference numeral 1, will be described in detail.

The spectrometer 1 is a monolithic, unitary body 2 of material. The material is optically homogeneous and transparent so that light may be transmitted therethrough in an unobstructed and unaltered manner. The material may be crystalline, glass, or plastic, depending on the application but is preferably polymethyl methacrylate (PMMA), a man-made acrylic which readily lends itself to the desired characteristics of transparency and resistance to frangibility, but most importantly, ease and susceptibility to the precision fabrication processes of ion-beam milling and diamond-turning machining which make possible the invention. In addition, the single unitary body or component eliminates common problems associated with alignment, adjustment and vibration.

Figure 2:
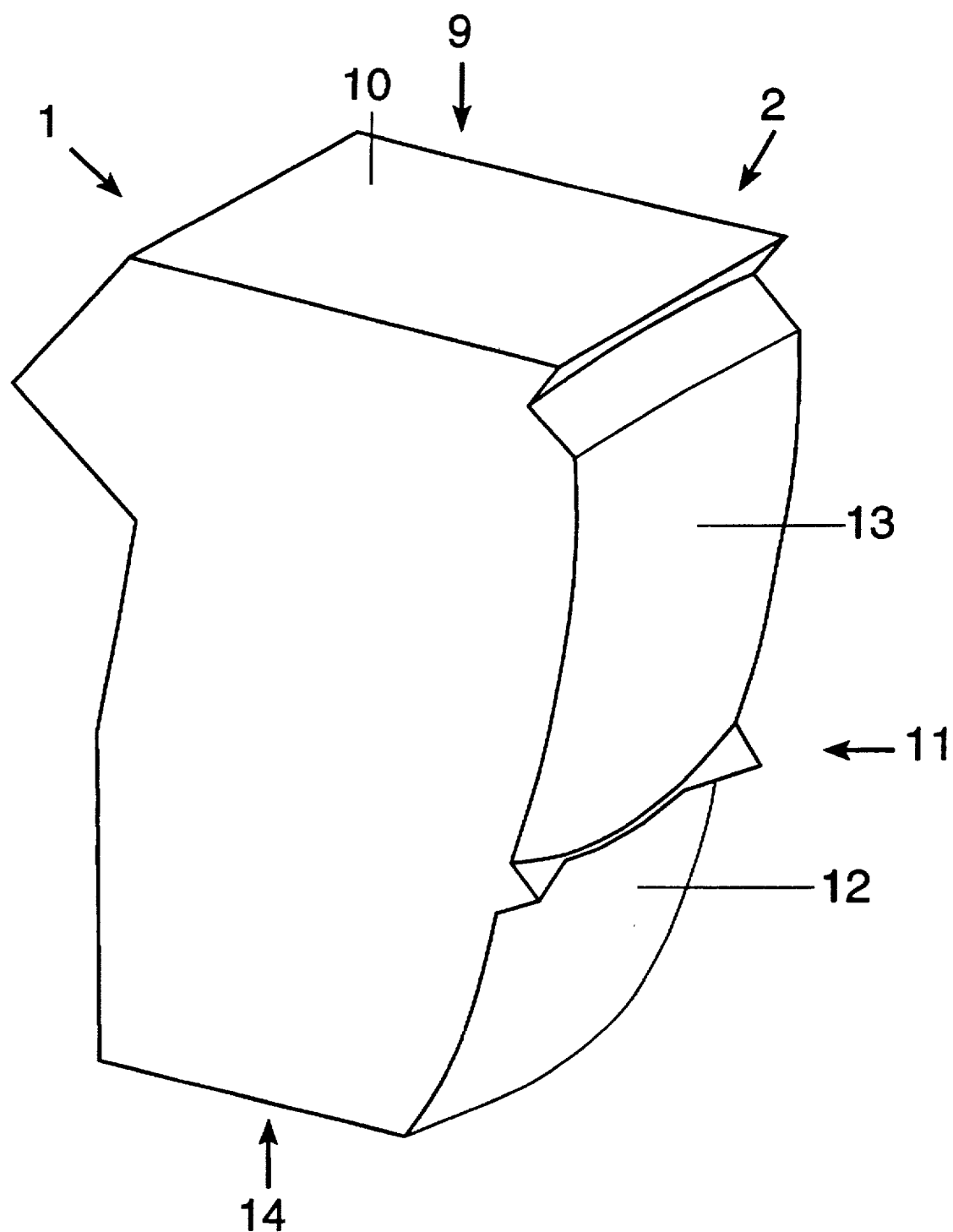
FIG. 2 is an isometric view of the spectrometer with the top and back sides facing the viewer.
Figure 3:
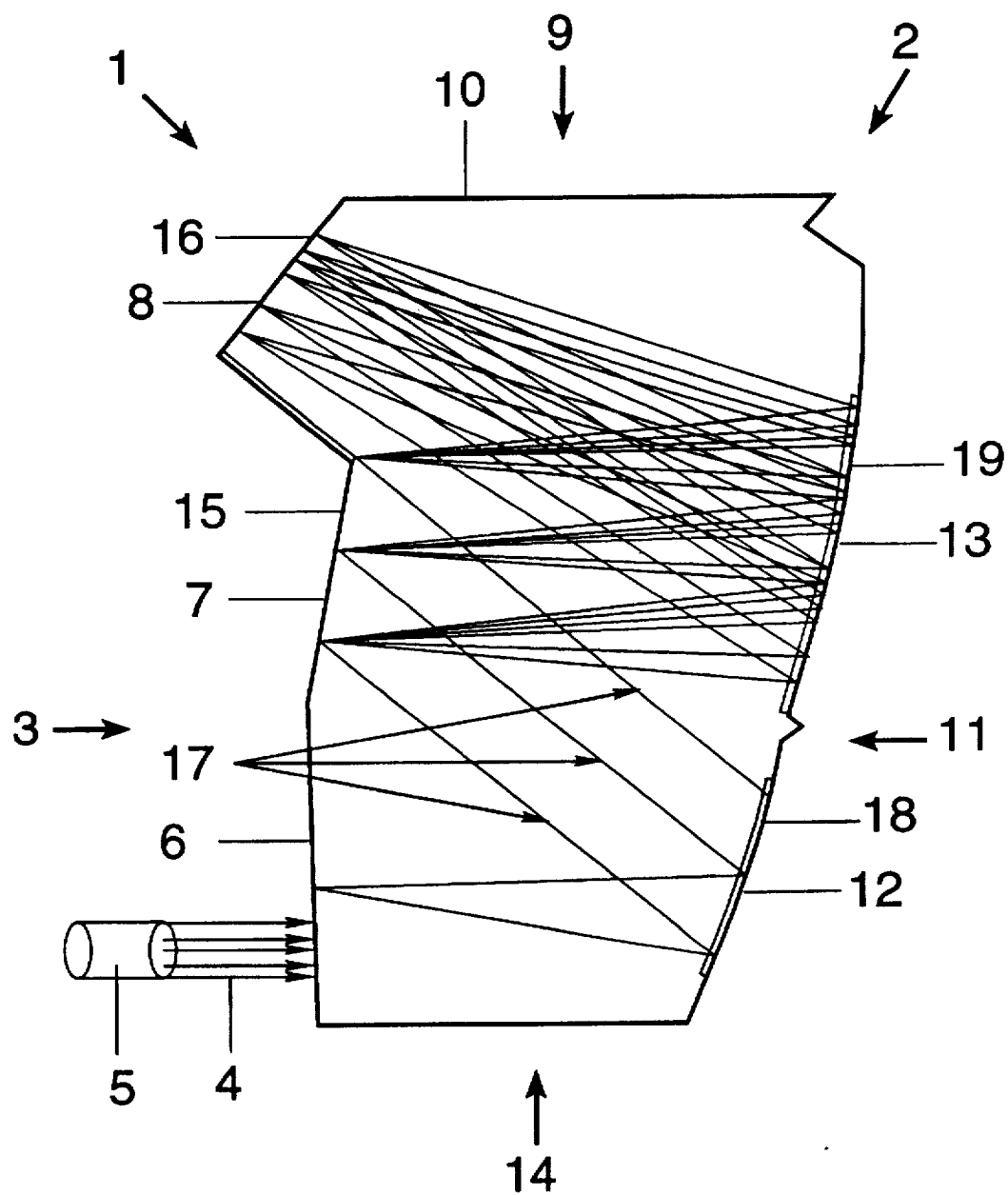
FIG. 3 is an elevation view of the spectrometer showing the path of the light rays with the front side on the viewer's left and the back side on the viewer's right and with the top side nearest the top of FIG. 3.

The spectrometer 1 may have a multitude of sizes, shapes and forms, but in most preferred instances, the spectrometer 1 is be a solid, rectangular, three-dimensional body 2 with defined surfaces. FIGS. 1, 2 and 3 show the spectrometer 1 in such a form. The front side 3 is the side from which light rays 4 enter from a light source 5 to be analyzed. The front side 3 comprises at least three distinct surfaces, 6, 7, and 8, each of these surfaces having a separate and distinct optical function. The top side 9 also comprises a distinct surface 10. The back side 11 has two distinct surfaces, 12 and 13, and each of these surfaces has a shape with a specific and distinct optical function. The bottom side 14, as does the top side 10, has no specific optical function and therefore may comprise one of several shapes depending on the application and location desired for the spectrometer.

Describing each of these surfaces in detail now, the entrance surface 6 of the front side 3 has a finish of preferably below 30 angstroms root mean square (RMS). This surface finish is achieved with ion-beam milling or diamond turning precision machining. It is through this entrance surface 6 that light rays 4 to be spectrally analyzed enter the spectrometer 1. This entrance surface 6 is positioned with respect to the other surfaces in order to direct the entering light rays 4 along a desired path within the spectrometer body 2.

A second surface on the front side 3 of the spectrometer 1 is the grating surface 7. This grating surface 7 has a plurality of very small grooves 15 whose number depends on the application. The preferred embodiment contains several hundred of these grooves 15 per millimeter along the grating surface 7. Other preferred embodiments might have different numbers dependent upon the design factors for specific applications. These grooves 15 are made using either ion-beam milling or diamond turning machining or they may be prefabricated and attached. These grooves 15 perform the function of diffracting the light rays 4, reflected from the collimating surface 12, into the color bands of the light spectrum.

A third surface on the front side 3 of the spectrometer 1 is the imaging surface 8. The purpose of the imaging surface 8 is to retain a detector material 16 with which the light rays 4 exiting the spectrometer 1 onto the imaging surface 8 can be spectrally analyzed. The detector material 16 is typically comprised of germanium or silicon.

Figure 4:
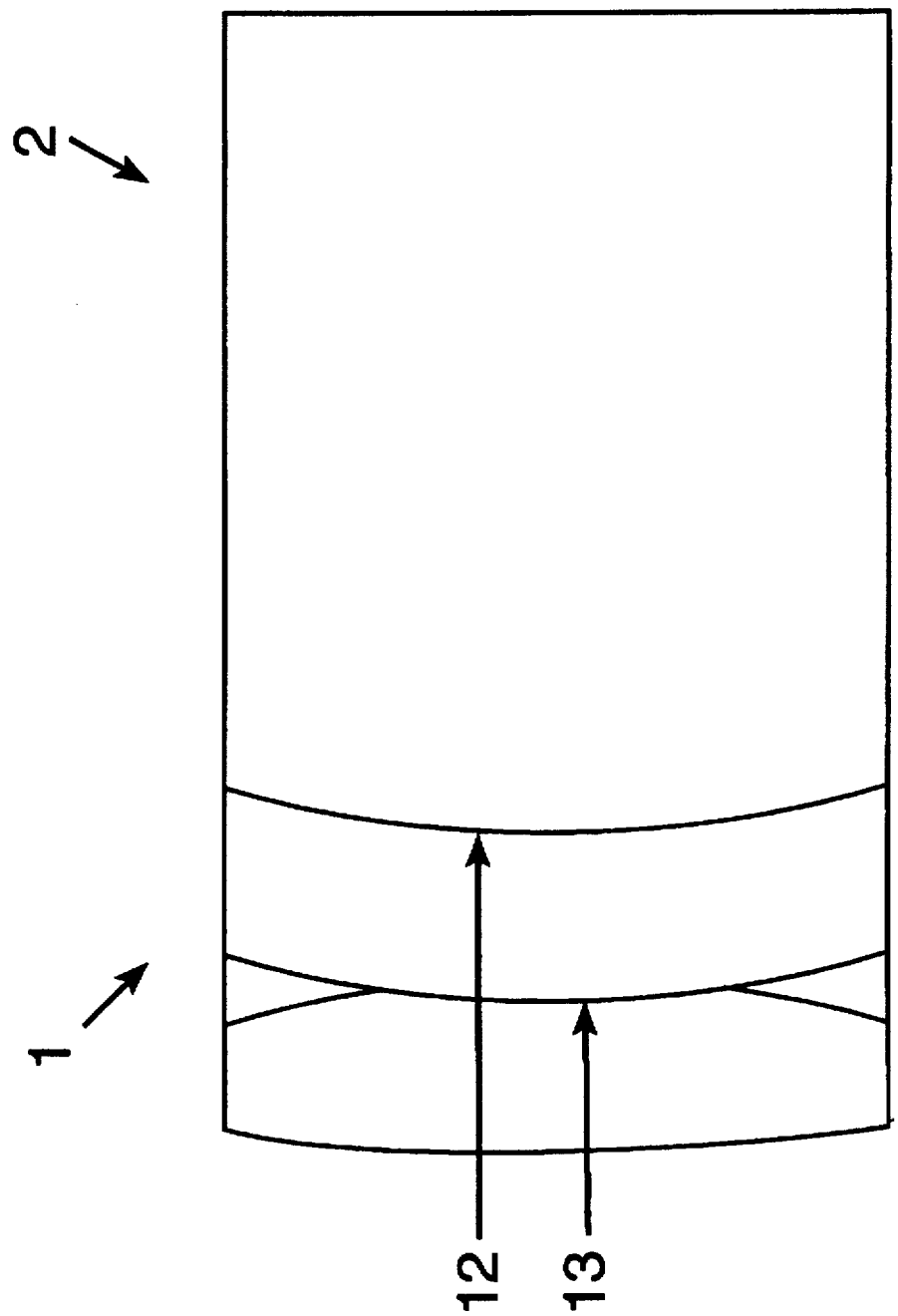
FIG. 4 is a top view of the spectrometer showing the aspheric shapes of the collimating and focusing surfaces.

The back side 11 of the spectrometer 1 comprises two surfaces, 12 and 13. One is the collimating surface 12 which is adjacent to the bottom side 14. In FIG. 4, the collimating surface 12 has an aspheric shape such as that of an ellipse or a parabola. This shape straightens the light rays 4, incoming from the entrance surface 6, into parallel columns 17. The collimating surface 12 is coated with a material 18 such as gold or silver to make it reflective. The finish of the collimating surface 12 is preferably below 30 angstroms root mean square (RMS). The collimating surface 12 is shaped and positioned to receive light rays 4 from the entrance surface 6 and reflect these same light rays 4 to the grating surface 7.

Adjacent to the top surface 10 of the spectrometer 1 and on the back side 11 of the spectrometer 1 is the focusing surface 13. This focusing surface 13 also has an aspheric shape and a coating of reflective material 19. The focusing surface 13 is positioned to receive the diffracted light rays 4 from the grating surface 7 and to reflect and focus these same light rays 4 to the imaging surface 8. The focusing surface 13 is ion-beam milled or diamond turned to a finish of preferably below 30 angstroms root mean square (RMS).

The manner of operation of the spectrometer 1 is as follows. Light rays 4 to be spectrally analyzed enter the spectrometer 1 through the entrance surface 6. These light rays 4 pass through the body 2 and strike the collimating surface 12. The collimating surface 12 straightens these light rays 4 into a column and reflects them onto the grating surface 7. The grooves of the grating surface 7 diffract these light rays 4 which are reflected onto the focusing surface 13. The focusing surface 13 focuses the light rays 4 onto the imaging surface 8 which analyzes the light rays 4 spectrally with the detector material 16.

The detector material 16 converts the light energy to an electrical impulse whereby the incoming light rays 4 are analyzed as with any spectrometer.

Figure 6:
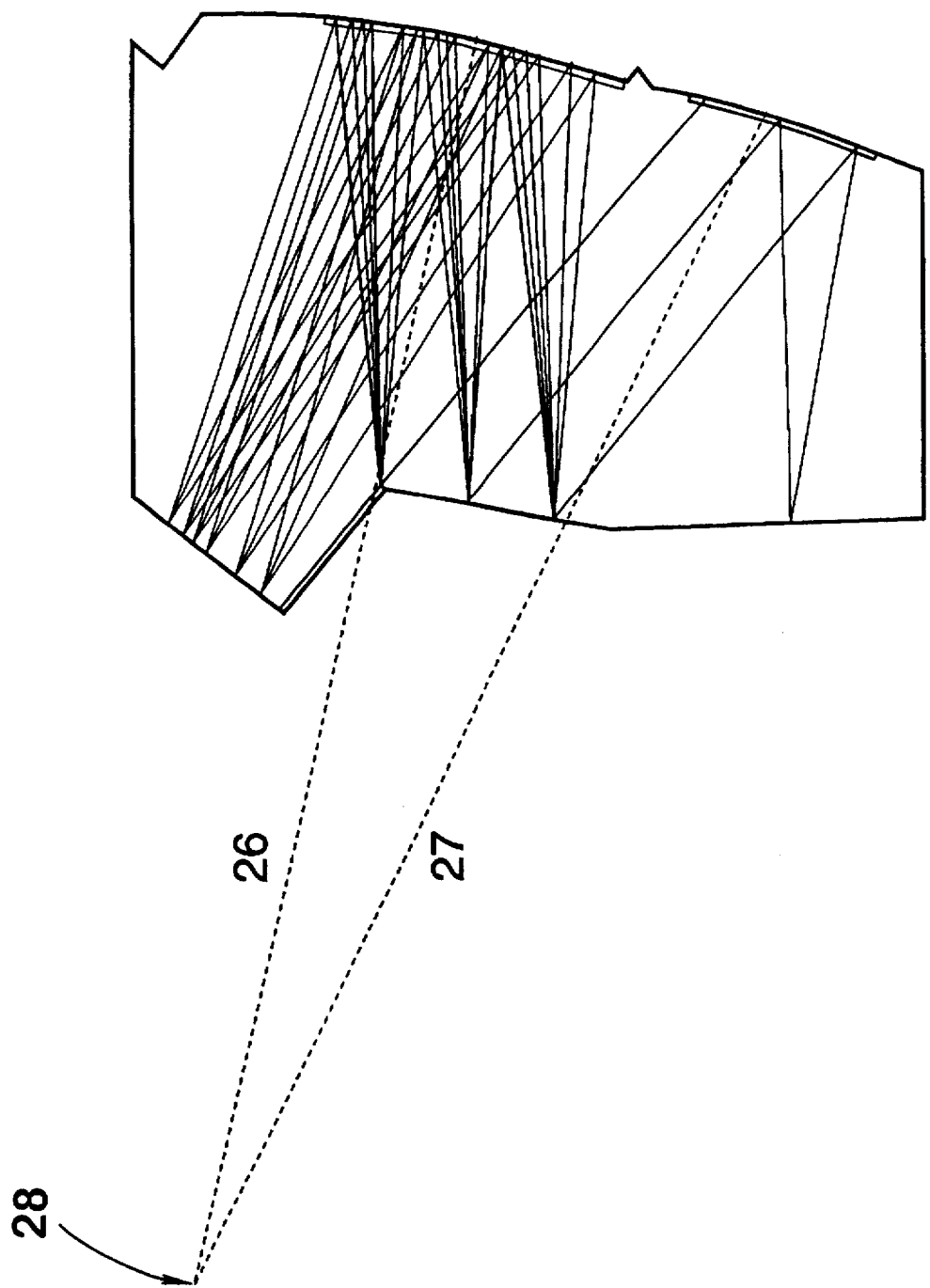
FIG. 6 is a schematic representation of the intersection of the axes of the two aspheric surfaces of the spectrometer.

In order for this manner of operation of the spectrometer 1 to be possible, that is, to allow the light rays entering the spectrometer to remain in a straight line while passing through the spectrometer, it is necessary that the center axes of the aspheric collimating surface and the aspheric focusing surface intersect at a common point as shown in FIG. 6. For these axes to so intersect at a common point requires a novel method of manufacture. The machining of multiple aspheric surfaces onto separate areas of a common object or piece of material is routinely performed, but the object must be offset with respect to the first surface when a second aspheric surface is machined. This method of manufacture does not permit the intersection of the center axes of the two aspheric surfaces in a predetermined geometric configuration. However, with the new and novel method of manufacture, described below in detail, multiple aspheric surfaces are machined while maintaining a predetermined and desired intersection and geometric configuration of aspheric surface axes. This method represents the preferable, if not only, method to be used in manufacturing the monolithic spectrometer.

Figure 5:
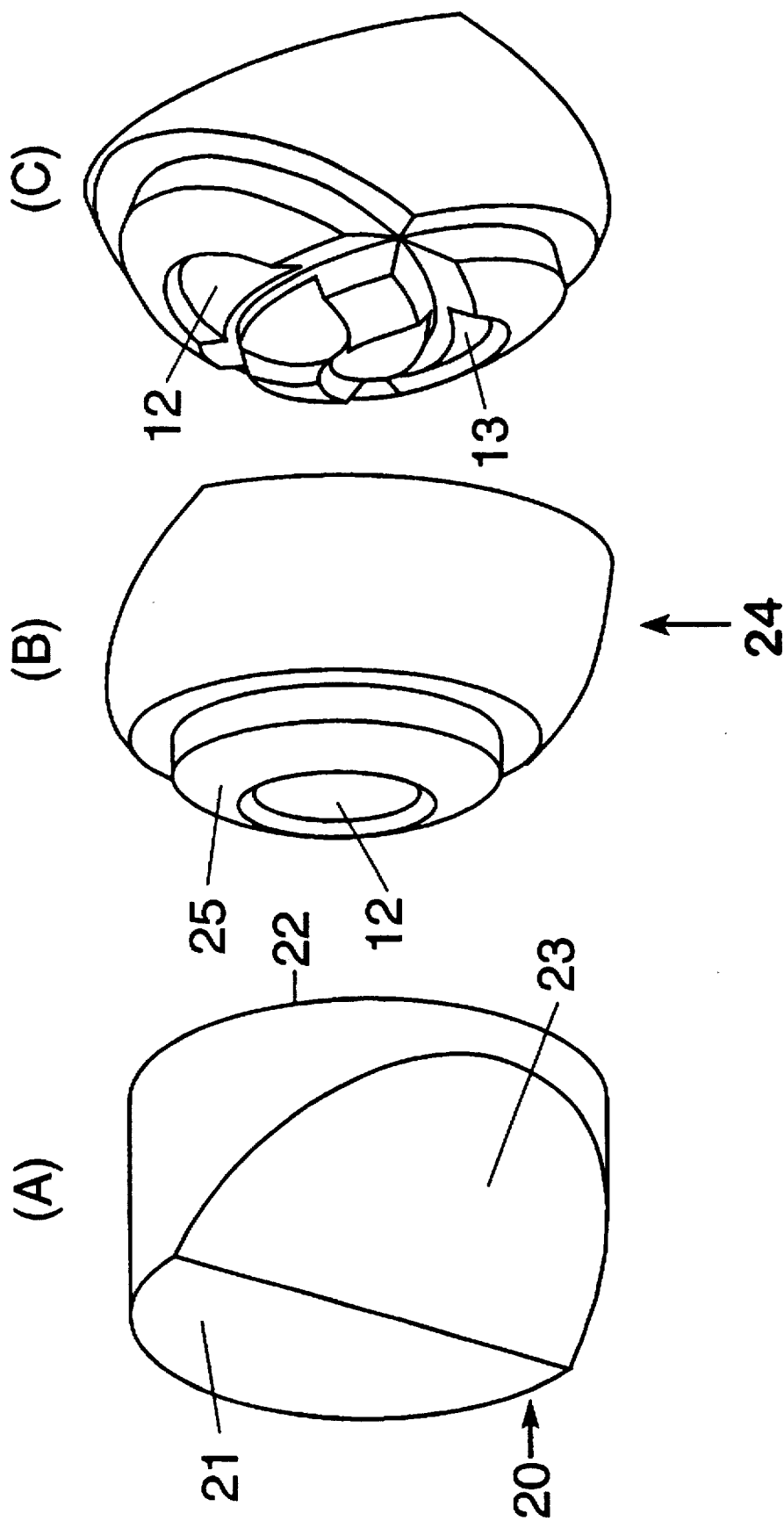
FIG. 5 represents a pictorial sequence of the steps (a through c) of the manufacturing method used in making the monolithic spectrometer.

FIG. 5 pictorially and sequentially portrays the steps (a) through (c) of this unique method of manufacture, which is described in detail as follows. A unitary body or substrate of transparent material is machined, usually by diamond turning precision machining or ion beam milling, into a cylinder 20 of predetermined diameter and parallel ends, 21 and 22, as shown in FIG. 5(a). This cylinder 20 is truncated from a diameter on one end [FIG. 5(a)] at a specified angle which is verified as to accuracy. This small, truncated, flat cylinder 20 is then machined on the side opposite the truncation 23 into a hemispherical shape 24 as shown in FIG. 5(b). Onto this hemispherical shape 24 is machined the aspherical shape, preferably a parabolic surface, which will become the collimating surface 12 of the monolithic spectrometer. Around this aspheric shape and concentric with it, is machined a cylindrical shape 25 which acts as a positioning shape for the truncated cylindrical 20 in a later step of the method as shown in FIG. 5(c). In preparation for machining the second aspheric shape, which will become the focusing surface 13, the truncated cylinder 20 is tilted onto the truncated side 23 and centered on the machining device with the use of a sphere (not shown) machined from the same material 1 and used solely as a working reference. The second aspheric shape is then machined adjacent to the first. The axes, 26 and 27, of the two aspheric shapes, intersect at the same point 28 on the truncated side 23 of the cylinder 20 as shown in FIG. 6. The very high degree of concentricity and accuracy needed is therefore achieved.

The truncated cylinder 20 is now turned over to machine other flat surfaces onto it. These two surfaces, the entrance surface 6 and the detector surface 8, are perpendicular to the respective axes, 26 and 27, of the two aspheric shapes which are, namely, the collimating surface 12 and the focusing surface 13.

In FIG. 1, the diffraction grating surface 7, is machined in a final step. The grating surface 7 is flat and positioned on the front side 3 with the detector surface 8 and the entrance surface 6, but the grating surface 7 is tilted with respect to the other two surfaces 6 and 8 as shown in FIG. 1.

Reflective coatings, 18 and 19, are applied respectively to the aspheric surfaces, 12 and 13, for reflectivity. The coating used may be gold or other similar reflective material.

A commercial diffraction grating (not shown) may be applied to the grating surface 7 in FIG. 1, or the grooves 15 may be machined into the grating surface 7.

The machining method is preferably performed with diamond turning precision machining, which is performed in a humidity-controlled environment to achieve extreme tolerances and accuracy.

With respect to the above description then, it is to be realized that the optimal dimensional relationships for the parts of the invention to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method for making a spectrometer and other aspheric-based monolithic optical systems, comprising the steps of:

(a) machining a single unitary optically homogeneous component into a cylindrical shape with a specified diameter, the cylinder having a first end and second end;

(b) removing material from the first end of the component along a predetermined angle, forming a truncate surface on one-half of the first end of the component;

(c) machining a spherical surface on the second end of the component;

(d) machining a plurality of aspheric surfaces, the surfaces having intersecting axes, onto the spherical surface of the second end of the component;

(e) machining the second end of the component into a hemispherical surface;

(f) machining a first aspheric surface on the hemispherical surface of the second end of the component;

(g) machining a first cylindrical surface on the second end of the component the first cylindrical surface forming around and concentric with the first aspheric surface;

(h) machining a second aspheric surface on the hemispherical surface of the second end of the component, the second aspheric surface adjacent the first aspheric surface, the center axes of both the first and second aspheric surfaces forming a plane through the center of the component intersecting at the focal points of the first and second aspheric surfaces and at the diameter representing the truncated surface of the first end of the component;

(i) machining a second cylindrical surface on the hemispherical surface of the second end of the component, the second cylindrical surface forming around and concentric with the second aspheric surface;

(j) machining a surface on the first end of the component;

(k) machining a surface on the second end of the component the surface adjacent to the surface on the first end of the component whereby the aspheric surfaces respectively serve as focusing and collimating surfaces of the monolithic spectrometer.

2. A method as recited in claim 1 for manufacturing said spectrometer and other aspheric-based monolithic optical systems, wherein said component is selected from the group consisting of sapphire, polymethyl methacrylate, optical glass, zinc sulfide, zinc selenide, silicon and germanium.

* * * * *

UNITED STATES PATENT AND TRADEMARK OFFICE
Certificate

Patent No. 5,754,290

Patented: May 19, 1998

On petition requesting issuance of a certificate for correction of inventorship pursuant to 35 U.S.C. 256, it has been found that the above-identified patent, through error and without deceptive intent, improperly sets forth the inventorship.

Accordingly, it is hereby certified that the correct inventorship of this patent is: Slobodan Rajic; Charles M. Egert; William K. Kahl; Boyd M. Evans, III; Troy A. Marlar; and Joseph P. Cunningham.

Signed and Sealed this Eleventh Day of April, 2000.

DONALD T. HAJEC
*Supervisory Patent Examiner*
Art Unit 2876